(12) United States Patent
Lacko

(10) Patent No.: US 9,714,612 B2
(45) Date of Patent: Jul. 25, 2017

(54) DRAG LINK FITTING AND VENT COMBINATION

(71) Applicant: ROHR, INC, Chula Vista, CA (US)

(72) Inventor: Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 958 days.

(21) Appl. No.: 14/045,971

(22) Filed: Oct. 4, 2013

(65) Prior Publication Data

US 2016/0376993 A1    Dec. 29, 2016

(51) Int. Cl.
| | | |
|---|---|---|
| F02K 1/54 | (2006.01) | |
| F02C 7/18 | (2006.01) | |
| F02K 1/70 | (2006.01) | |
| F02C 7/12 | (2006.01) | |
| F01D 25/24 | (2006.01) | |
| F02K 1/72 | (2006.01) | |
| F02K 1/76 | (2006.01) | |
| F02K 3/06 | (2006.01) | |

(52) U.S. Cl.
CPC ............... *F02C 7/18* (2013.01); *F01D 25/24* (2013.01); *F02C 7/125* (2013.01); *F02K 1/70* (2013.01); *F02K 1/72* (2013.01); *F02K 1/766* (2013.01); *F02K 3/06* (2013.01); *F05D 2220/323* (2013.01); *F05D 2240/14* (2013.01); *F05D 2260/20* (2013.01); *F05D 2260/608* (2013.01); *F05D 2260/96* (2013.01); *Y02T 50/672* (2013.01); *Y02T 50/675* (2013.01)

(58) Field of Classification Search
CPC ..... F02K 1/54; F02K 1/56; F02K 1/58; F02K 1/72; B64D 33/04
See application file for complete search history.

(56) References Cited

U.S. PATENT DOCUMENTS

| | | | | |
|---|---|---|---|---|
| 8,109,467 B2 * | 2/2012 | Murphy | ................... | F02K 1/72 244/110 B |
| 9,212,624 B2 * | 12/2015 | Aten | ...................... | F02K 1/766 |
| 9,255,547 B2 * | 2/2016 | Beardsley | .............. | B64D 29/06 |
| 2010/0150700 A1 * | 6/2010 | Strecker | .................. | F01D 9/065 415/116 |
| 2010/0270428 A1 * | 10/2010 | Murphy | ................... | F02K 1/72 244/110 B |

FOREIGN PATENT DOCUMENTS

| | | |
|---|---|---|
| EP | 2243945 | 10/2010 |
| GB | 2445237 | 7/2008 |
| WO | 2014/159311 | 10/2014 |

OTHER PUBLICATIONS

European Search Report for International Application No. 14187491.7-1607, dated Jan. 15, 2015.
Core Cowl to Engine Handling Bleed Interface—Outside Core compartment looking in, 2004, Boeing.
IFS Bond Panel Insulation—Upper Fwd., 2004, Boeing.
IFS to Engine interface showing Forward Seal, Inner 'V' Blade and Core Ventilations Ejectors, 2004, Boeing.
777 Thrust reverser, 2006, Boeing.

* cited by examiner

*Primary Examiner* — Philip J Bonzell
(74) *Attorney, Agent, or Firm* — Snell & Wilmer L.L.P.

(57) ABSTRACT

A nacelle is disclosed. The nacelle may comprise, in various embodiments, a drag link fitting mounted to an Inner Fixed Structure (IFS) and pivotally attached to an end of a drag link, and a vent defining a passageway through the IFS to bring cooling air through the IFS. The drag link fitting may be aerodynamically associated with the vent such that the drag link fitting helps direct air into the vent.

11 Claims, 7 Drawing Sheets

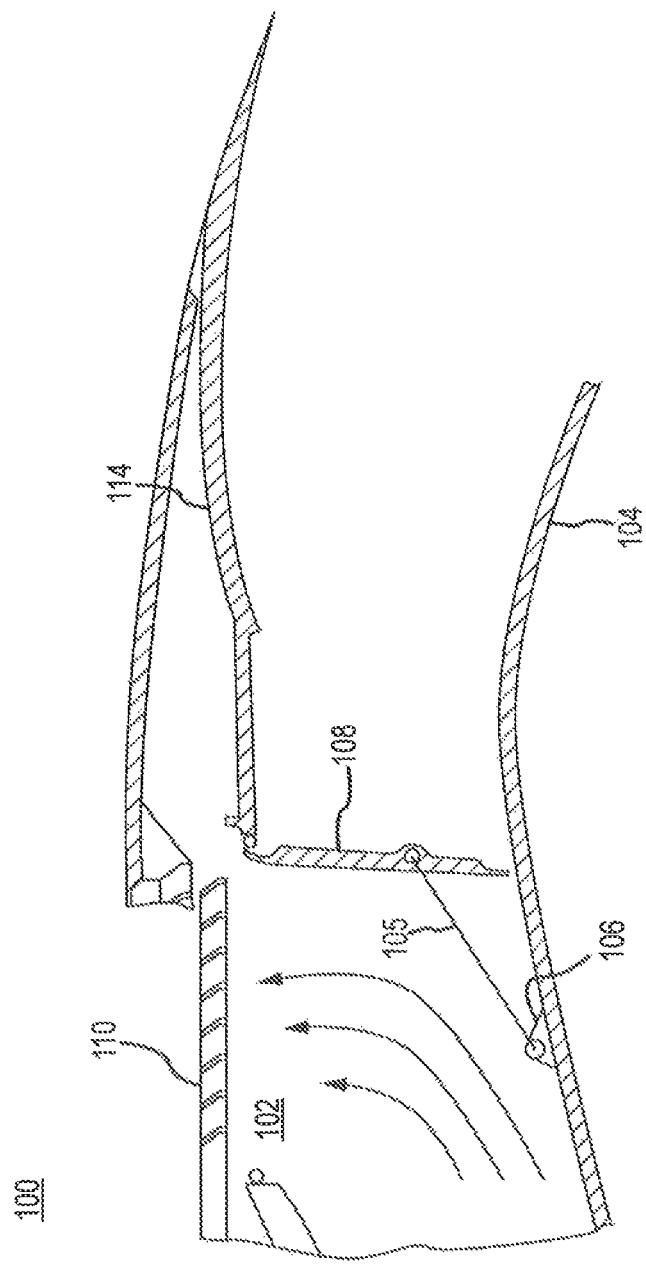

DRAG LINK FITTING AND VENT COMBINATION

FIELD

The present disclosure relates to a nacelle system for a jet aircraft propulsion system, and more particularly, to drag link fittings and ports for cooling air.

BACKGROUND

Jet aircraft propulsion systems, such as those that power modern commercial aircraft, typically include an annular bypass air duct situated substantially concentrically about an engine core. The bypass air duct may be separated from the engine core by an inner fixed structure ("IFS"). The IFS defines the interior aerodynamic surface of the annular bypass air duct, and surrounds the engine core forming a substantially annular enclosed space (or "core cavity") around the engine core. The engine core may generally comprise a compressor, a combustion section, and a turbine as its primary components. Surrounding the engine core and within the core cavity, numerous support systems (such as fuel, oil and hydraulic systems) support these primary components and may operate at very high temperatures. The core cavity may therefore require substantial cooling during operation. To this end, one or more vents may extend through the IFS to channel cooler air flowing within the bypass air duct into the annular enclosed space surrounding the engine core.

Several thrust reverser components may be coupled to the IFS. The components may include one or more blocker doors as well as one or more drag links associated with each blocker door. The drag links may be attached to the blocker doors and may form part of a kinematic mechanism to deploy the blocker doors during thrust reverser operation. The drag links may be attached to the IFS via a drag link fitting.

Drag link fittings and vent holes may contribute to drag and may hinder efforts to attenuate noise in the bypass air duct. Drag link fittings and vent holes can be situated proud of the surface of the IFS and lie in the air stream of the bypass air duct, thus interrupting air flow and creating drag. The IFS may typically comprise an acoustic treatment or noise suppressing structure. This structure may comprise a perforated top layer and a bottom layer, between which a honeycomb shaped core may be disposed. Noise may be attenuated within the cavities formed by the honeycomb shaped core. Where the IFS is penetrated by a drag link fitting or a vent, however, no noise suppressing structure may be included. Instead, to counteract stresses, the IFS surrounding a drag link fitting or vent is typically constructed of a structural material that does not include the perforated top layer and sound attenuation features.

In addition, as jet engines continue to increase in size, power, and/or efficiency, engine operating temperatures tend to increase as well. To compensate for these high temperatures, the number and size of ventilation apertures (or vents) formed between the bypass air duct and the engine core cavity have increased, lessening the area available for acoustic treatment as well as increasing drag over the IFS. There is, then, a need for an. improved design which minimizes drag and/or improves sound attenuation.

SUMMARY

A nacelle is disclosed. The nacelle may comprise, in various embodiments, a drag link fitting mounted to the IFS and pivotally attached to an end of the drag link and/or a vent mounted to the IFS and defining a passageway therethrough to bring cooling air through the IFS. The drag link fitting may be aerodynamically associated with the vent such that the drag link fitting helps direct air into the vent. The nacelle may further comprise an air inlet, which may be configured to aerodynamically cooperate with a vent in the IFS. The drag link fitting may comprise an outer portion and/or an inner portion, and the inner portion and the outer portion may be joined prior to being joined to the IFS and/or as they are joined to the IFS (e.g., at substantially the same time that they are joined to the IFS). The outer portion may be manufactured differently than the inner portion (e.g. a forged machined metallic outer portion and a cast metallic inner portion). The vent may descend through the IFS along a sloping trajectory and/or orthogonally to a surface of the IFS. The drag link fitting may further comprise a low profile air inlet, a crescent shaped air inlet, and/or a concave air inlet that funnels air into the vent, where the vent may descend through the IFS substantially orthogonally to a surface of the IFS. The vent may bulge radially within the IFS.

A nacelle is disclosed. The nacelle may comprise, in various embodiments, a drag link fitting comprising an air inlet and/or an IFS having a vent, where the air inlet may be situated over the vent. The drag link fitting and/or the vent may be mounted separately and/or together to the IFS. The vent may descend through the IFS, such as along a sloping trajectory and/or substantially orthogonally to a surface of the IFS. The drag link fitting may further comprise an outer portion and/or at least one inner portion. As described herein, the outer portion may a forged and/or machined metallic, structure, while the inner portion may comprise a cast metallic portion. The drag link fitting may further comprise a low profile air inlet.

A drag link fitting is disclosed. The drag link fitting may comprise, in various embodiments, an air inlet that aerodynamically cooperates with a vent in an inner fixed structure ("IFS") and/or a drag link coupling portion that couples the drag link fitting to a drag link. The drag link fitting may further comprise the vent and/or the drag link fitting may be at least one of: formed with the IFS and/or mounted to the IFS.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1C illustrates, in accordance with various embodiments, a cross-sectional view of a thrust reverser in a deployed position.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the engine. As used herein, "forward" refers to the direction associated with the nose (e.g., the front end) of an aircraft, or generally, to the direction of flight.

Figure 1A:
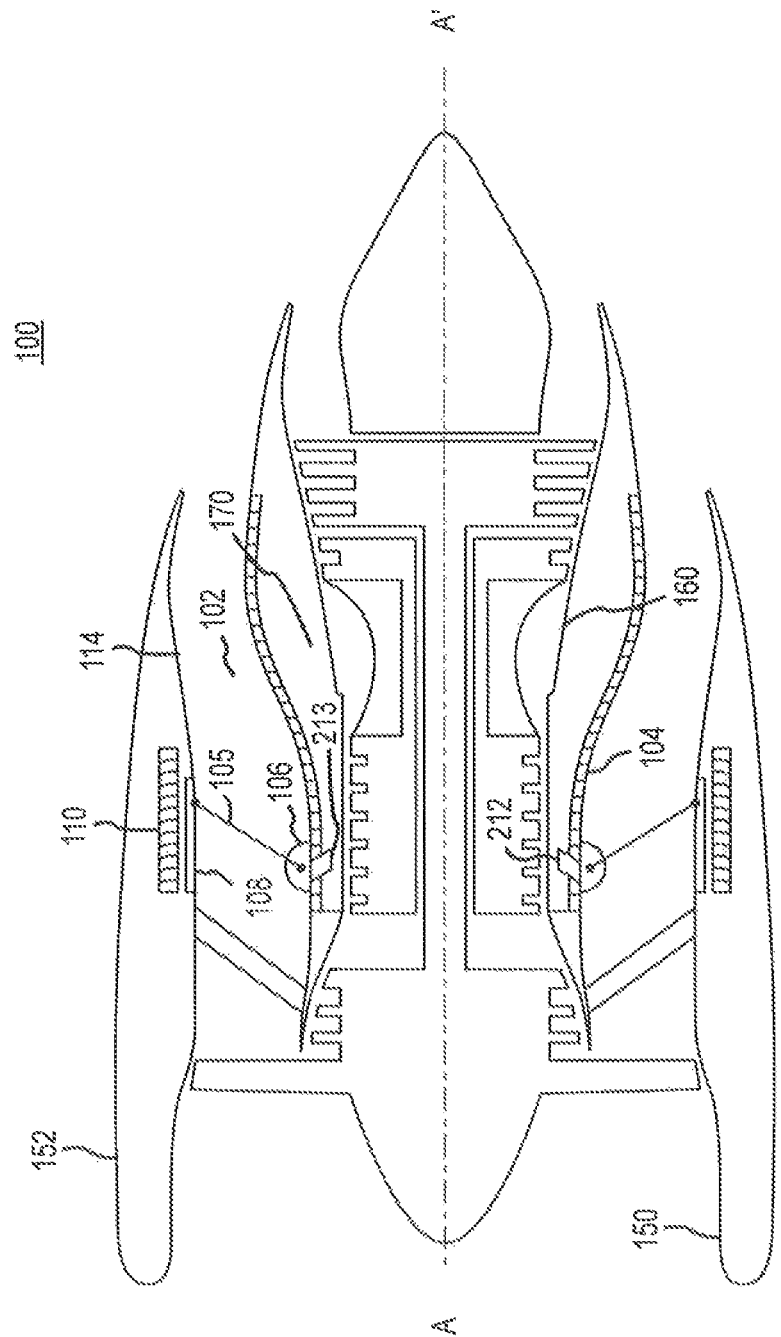
FIG. 1A illustrates, in accordance with various embodiments, a cross-sectional view jet aircraft propulsion system.

With reference now to FIG. 1A, a jet aircraft propulsion system 100 is shown and may generally comprise a nacelle 152 and an engine core 160. The engine core 160 may be contained within the IFS 104 and surrounded by a core cavity 170. The propulsion system 100 may extend from forward to aft along the axis AA', with point A being forward of point A' and point A' being aft of point A. In flight, air from point A may flow around and/or through the propulsion system 100 in the direction from point A to point A'.

The nacelle 152 may define an outer airflow surface of the propulsion system 100. The nacelle 152 may include an air inlet 150 through which air may enter the propulsion system 100. Some portion of airflow may enter the engine core 160, and some portion of airflow may bypass the engine core 160 through bypass air duct 102. The IFS 104 may define an inner airflow surface of the bypass duct 102. The translating sleeve 114 may define the outer airflow surface of bypass duct 102. The IFS 104 may be disposed coaxially about an engine core 160. The engine core 160 may burn a hydrocarbon fuel in the presence of compressed air to generate exhaust gas. The exhaust gas may drive a turbine, which may, through a shaft, drive a turbofan at the forward portion of the propulsion system 100. The turbofan may rotate to generate bypass fan airflow in a bypass air duct 102.

Figure 1B:
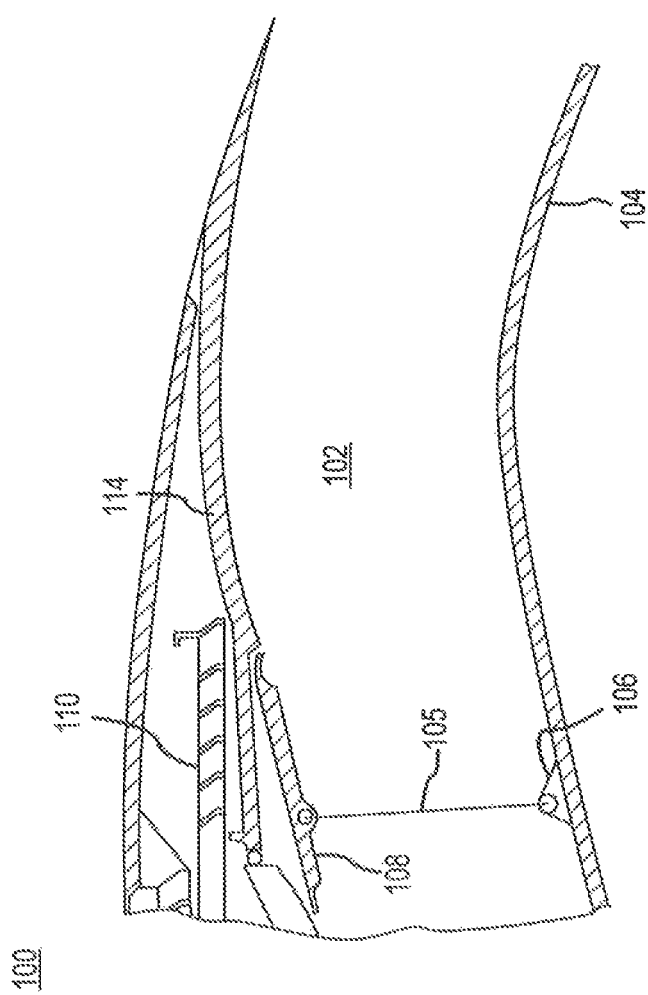
FIG. 1B illustrates, in accordance with various embodiments, a cross-sectional view of a thrust reverser in a stowed position.

The propulsion system 100 may further comprise a thrust reversing section or a thrust reverser, as shown at FIG. 1B. The thrust reverser may comprise a plurality of thrust reverser components, including, for example, a cascade 110, one or more blocker doors 108, one or more drag links 105 with associated drag link fittings 106, and/or one or more translating sleeves 114.

With further attention to FIG. 1B, a blocker door 108, shown herein in a stowed configuration, may be pivotally coupled to the IFS by a drag link 105. The drag link 105 may, in turn, be pivotally coupled to the IFS by a drag link fitting 106, discussed in greater detail below. The blocker door 108 may be further pivotally coupled to the translating sleeve 114.

During a thrust reversing operation, and with reference now to FIG. 1C, the blocker door 108 may deploy from its stowed position to its deployed position to block bypass air flowing through the bypass air duct 102. In particular, the translating sleeve 114 may translate axially in an aft direction. As the translating sleeve 114 translates aft, the pivotal connection point between the blocker door 108 and the translating sleeve also translates. In cooperation with the drag link 105 which is pivotally connected to the blocker door 108 and the drag link fitting 106, the blocker door forms a kinematic system which causes the blocker door to deploy in a known manner to its deployed position shown in FIG. 1C when the translating sleeve translates aft. As shown, in a deployed position, the blocker door 108 may project radially within the fan duct 102 to block at least a portion of the fan air flow in the bypass air duct 102. Thus, the blocker door 108 may be deployed to redirect fan air flowing through the bypass air duct 102 into the cascade 110. The cascade 110 may, in turn, channel fan air in a generally forward direction to generate reverse or forward acting thrust.

Figure 2A:
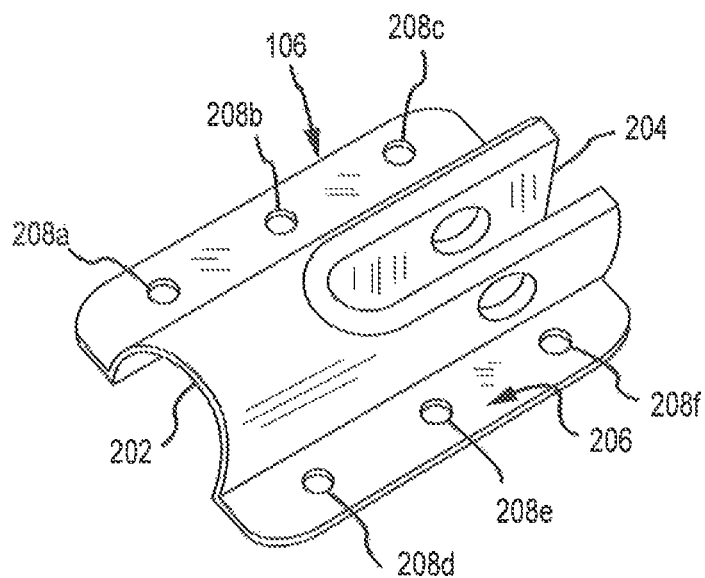
FIG. 2A illustrates, in accordance with various embodiments, a perspective view of a drag link fitting.
Figure 2B:
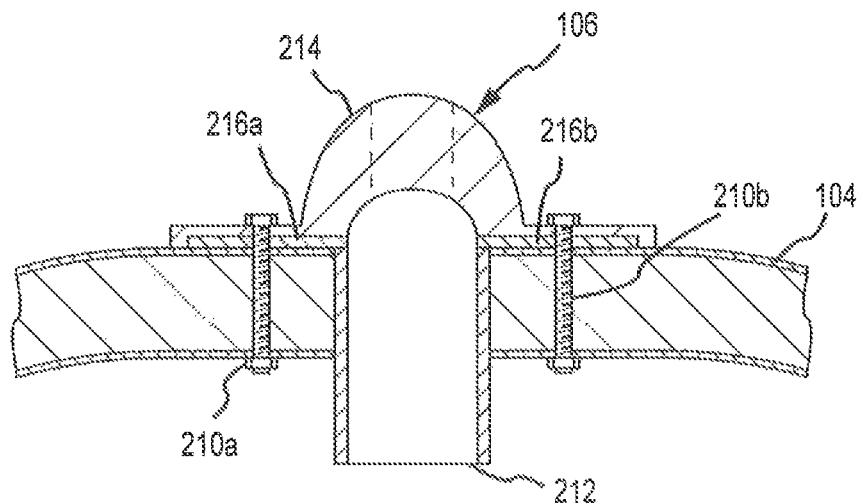
FIG. 2B illustrates, in accordance with various embodiments, a cross-sectional view of a drag link fitting coupled to an IFS and cooperating with a cooling vent.
Figure 2C:
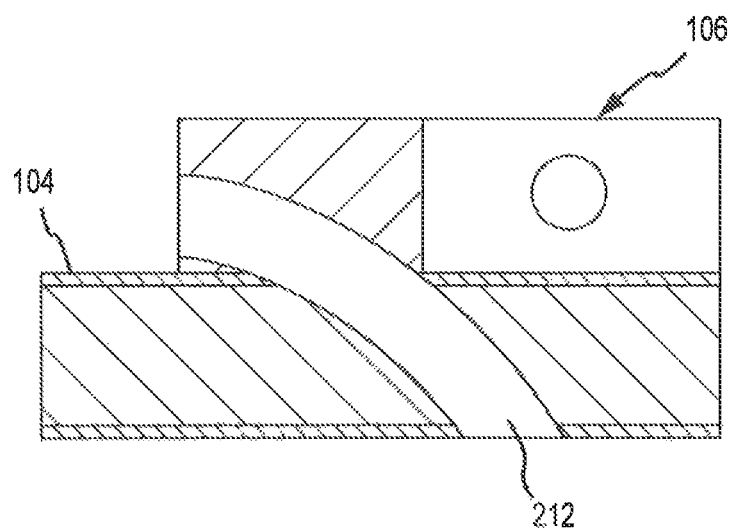
FIG. 2C illustrates, in accordance with various embodiments, a cross-sectional view of a drag link fitting coupled to an inner fixed structure and incorporating a sloping vent.

With reference now to FIGS. 2A-2C, an exemplary combination drag link fitting and cooling vent are shown. The drag link fitting 106 may comprise an air inlet 202, a drag link coupling portion 204, an IFS coupling flange 206. The drag link fitting 106 may, as described herein, guide fan airflow into a vent, such as a vent 212 and/or vent 213.

The drag link fitting 106 may couple to or be mounted on the IFS 104. In addition, the vent 212 may be coupled to or be mounted on the IFS 104. The drag link fitting 106 and/or the vent 212 may be coupled to or mounted on the IFS 104 individually and/or as a combined drag link fitting 106 and vent 212. Further, the inlet 202 and/or the vent 212 may be formed as part of the IFS 104 and the drag link fitting 106 coupled to or mounted on the IFS 104 (e.g., over the vent 212). Further still, both the vent 212 and the drag link fitting 106 may be formed as part of the IFS 104.

Any suitable apparatus or method may be used to couple the drag link fitting 106 and/or vent 212 to the IFS 104 and/or to form the drag link fitting 106 and/or vent 212 with the IFS 104. For example, as shown, in various embodiments, the IFS coupling flange 206 may comprise a plurality of apertures 208a-208f. Coupling members 210a and 210b, such as a rivet, a bolt, or a screw may be inserted through each aperture 208a-208f to secure the IFS coupling flange 206 to the IFS 104, in other embodiments, the IFS coupling flange 206 may be secured to the IFS 104 by way of any of a variety of other suitable means, including via an adhesive, a pressure fitting or pressure bond, a heat bond, a weld, and the like. In addition, the drag link fitting 106 and/or vent 212 may be formed as an integral part of the IFS 104 (e.g., during construction of the IFS 104). Further still, the drag link fitting 106 and/or vent 212 may be bonded or mounted to the IFS 104 by way of an adhesive, a pressure fitting process, a heat bonding process, and the like.

In various embodiments, the vent 212 may descend through the IFS 104 at any of a variety of grades and/or angles. For example, as shown at FIG. 2C, the vent 212 may descend gradually along a sloping or curving trajectory through the IFS 104. In addition, in various embodiments and as shown at FIG. 2B, the vent 212 may descend at a substantially ninety degree angle through the IFS 104.

The air inlet 202 is positioned upstream of the majority of the drag link fitting 106, such that a portion of the air that would otherwise have to flow around the drag link fitting will instead be scooped into the air inlet 202 and flow through the vent 212. The air inlet may be formed so that its opening "axis" is generally parallel to and in the direction of the air flow in the bypass air duct to scoop the air. Thus, the drag link fitting 106 aerodynamically cooperates with the vent 212 to provide cooling air thereto.

As in the illustrated embodiments herein, the drag link fitting 106 may be situated over the vent 212. This may, in turn, permit an increase in the IFS 104 volume and/or surface area available for acoustic treatment, because the vent 212 may extend through the IFS 104 radially inboard of the drag link fitting 106. More particularly, where conventional systems typically lack acoustic treatment both within the area of one or more zone vents as well as radially inward of a drag link fitting, the combination drag link fitting 106 may be situated over the vent 212 (and or form part of the vent 212), such that a greater IFS 104 surface area or volume is available for acoustic treatment. In other words, the drag link fitting 106 and the vent 212 may be combined to provide greater surface area and/or volume over or within the IFS 104 for acoustic treatment.

The drag link fitting 106 experiences, during operation of the thrust reverser, extremely high stresses. In particular, as described above, the drag link fitting 106 is coupled to the drag link 105. The drag link 105, in turn, deploys the blocker door 108 during a thrust reversing maneuver (e.g., during landing). The drag link fitting 106 must therefore resist large loads as fan air is blocked and redirected by the blocker door 108.

The drag link fitting 106 and the vent 212 may be formed as a single, integral component, or they may be thrilled separately and joined together before installation onto the IFS, or joined together at the same time as they installed on the IFS, as may be decided by a person skilled in this art. If formed as separate components, the drag link fitting 106 and the vent 212 may be advantageously formed with different manufacturing processes. For example, the drag linking fitting may be manufactured with a forging process for strength, or alternatively by a machining process, a casting process, a combination of a machining, forging, and/or casting processes, and the like. The vent link could be formed through casting because of its potentially complex curved shapes, or it could be formed through machining, forging, etc.

In various embodiments, the outer portion 214 may be coupled to the one or more inner portions 216a and 216b by way of one or more coupling members 210a and/or 210b. Further, the outer portion 214 may be situated over and/or about the inner portions 216a and/or 216b. In addition, in various embodiments, the outer portion 214 may be coupled to the one or more inner portions 216a and 216b by way of an adhesive, a pressure fitting or pressure bond, a heat bond, a weld, and the like.

With further attention to the manufacturing techniques applied to the outer portion 214 and/or the inner portions 216a and 216b, in various embodiments, the outer portion 214 may be forged or machined to resist high fatigue and loading stresses, as described above. In some cases a complicated aerodynamic shape may be very difficult to machine (e.g. aerodynamic tubes). Therefore, the inner portions 216a and 216b may be manufactured using a casting process, as the inner portions 216a and 216b may be subject to reduced fatigue and loading stresses that would allow for a casting. Construction of a partially cast, partially forged or machined, drag link fitting 106 may result in a drag link fitting 106 capable of withstanding high loading stresses, yet still capable of utilizing a complicated aerodynamic shape. However, in various embodiments, either or both of the outer portion 214 and/or the inner portions 216a and 216b may be machined, forged, and/or cast. In various embodiments, either or both of the outer portion 214 and/or the inner portions 216a and 216b may be manufactured from a variety of metallic and/or non-metallic manufacturing processes. For example, a variety of weldments, a composite material manufacturing process such as chopped fiber molding, or plastics manufacturing process such as injection molding or 3-dimensional printing, and the like.

The air inlet 202 may, in various embodiments, comprise a curving geometry, such as, for example, a substantially hemispherical geometry. Further, as described herein, the air inlet 202 may be configured to scoop or funnel fan air into the drag link fitting 106 and down through the IFS 104.

Figure 3A:
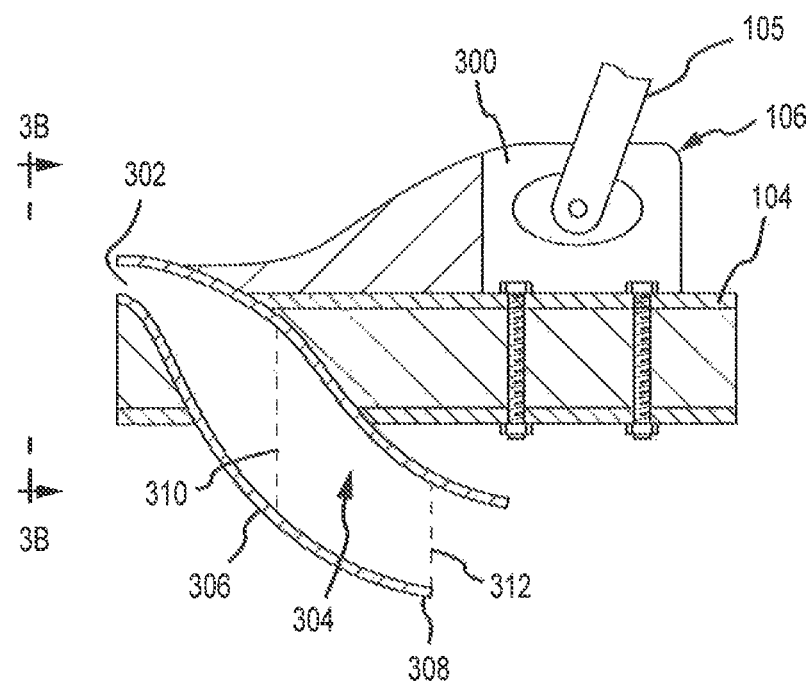
FIG. 3A illustrates, in accordance with various embodiments, a cross-sectional view of a low profile vent.

With reference to FIGS. 3A and/or 3B, in various embodiments, a drag link fitting 300 may comprise a low profile air inlet 302. A low profile air inlet 302 may experience reduced aerodynamic loading stresses in comparison to larger profile air inlets (e.g., air inlet 202). A low profile air inlet 302 may, in addition, minimize or lessen aerodynamic drag within the fan duct 102.

Figure 3B:
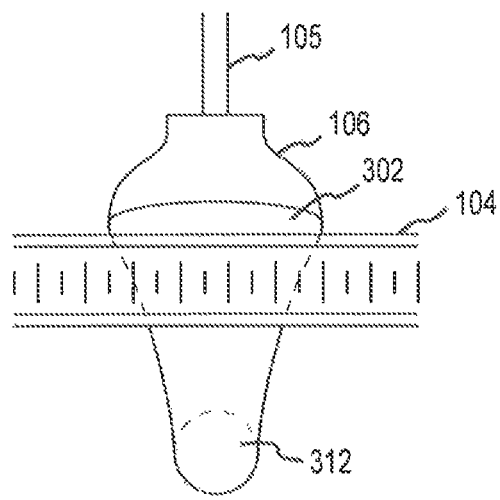
FIG. 3B illustrates, in accordance with various embodiments, a cross-sectional view of a low profile vent.

With additional attention to FIG. 3A and 3B, in various embodiments, a low profile air inlet 302 may channel airflow into a bulging vent 304. More particularly, the vent 304 may increase in a first dimension from the inlet 302 to comprise an expanded first dimension portion 306 (as shown by the dotted line 310), e.g., at of the inlet 302. The vent 304 may further, in various embodiments, decrease again in a second dimension aft of the expanded first dimension portion 306 to comprise a second reduced dimension portion 308 (as shown by the dotted line 312). In various embodiments, the channel 304 may be employed with any of the drag link fittings disclosed herein. A low profile air inlet 302 may thus, in various embodiments, transition from a flattened or elliptical inlet 302 (and/or other shaped inlet, such as a rectangular or other polyhedral inlet) to a more cylindrical structure (and/or other shaped structure, such as a rectangular or other polyhedral structure) as it passes through the IFS. A low profile air inlet 302 may permit a large quantity of fan air to enter the inlet 302 at high velocity, while an expanding or bulging diameter aft of the inlet 302 may permit alteration of the fan air velocity within the vent 304.

Figure 4A:
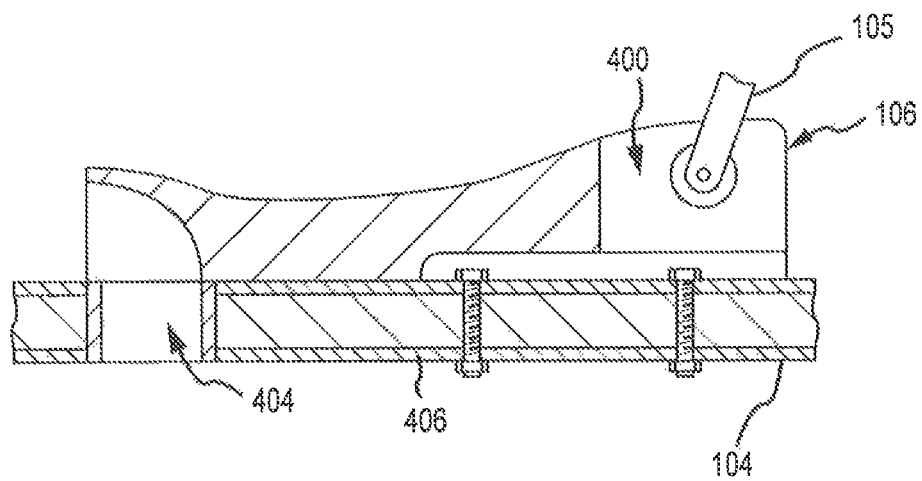
FIG. 4A illustrates, in accordance with various embodiments, a cross-sectional view of a drag link fitting having a crescent shaped air inlet.
Figure 4B:
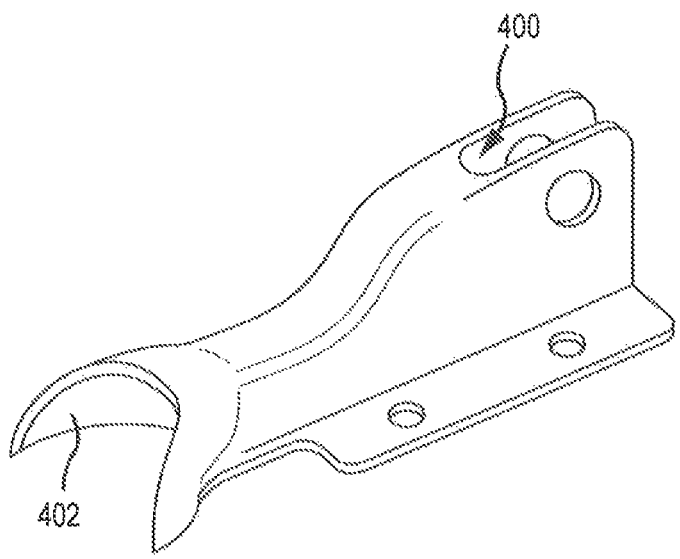
FIG. 4B illustrates, in accordance with various embodiments, a perspective view of a drag link fitting having a crescent shaped air inlet.

Referring now to FIGS. 4A and 4B, a drag link fitting 400 may, in various embodiments, comprise a crescent shaped or concave air inlet 402. Such an inlet 402 may be used in combination with a vent 404 that descends substantially orthogonally to an IFS 406 surface. In particular, a crescent shaped air inlet 402 may scoop or funnel fan air into the vent 404. Airflow may thus be effectively channeled into an orthogonally descending vent 404. Further, in various embodiments, the drag link fitting 400 may comprise any shape that permits a vent 212 to be formed in or mounted on the IFS 104 such that the vent 212 does not interfere with or make contact with a portion of the IFS 104 that is joined to the drag link fitting 400.

The connecting lines shown in the various figures contained herein are intended to represent exemplary functional relationships and/or physical couplings between the various elements. It should be noted that many alternative or additional functional relationships or physical connections may be present in a practical system.

The described benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A nacelle comprising:
    a drag link fitting mounted to an Inner Fixed Structure (IFS) and adapted to be pivotally attached to an end of a drag link; and
    a vent defining a passageway through the IFS to bring cooling air through the IFS, the drag link fitting being aerodynamically associated with the vent such that the drag link fitting helps direct air into the vent;
    wherein the drag link fitting comprises an outer portion and an inner portion, and the outer portion and the inner portion are joined,
    wherein the drag link fitting comprises an air inlet which is generally forward of the drag link fitting and acts to scoop air from a fan air bypass duct and direct it to the vent.

2. The nacelle of claim 1, wherein the drag link fitting further comprises the air inlet, wherein the air inlet is configured to aerodynamically cooperate with a vent in the IFS.

3. The nacelle of claim 1, wherein the outer portion and the inner portion are joined to each other prior to the drag link fitting being joined to the IFS.

4. The nacelle of claim 1, wherein the outer portion and the inner portion are joined together when they are each joined to the IFS.

5. The nacelle of claim 1, wherein the vent descends through the IFS along a sloping trajectory.

6. The nacelle of claim 1, wherein the vent descends through the IFS substantially orthogonally to a surface of the IFS.

7. The nacelle of claim 1, wherein the drag link fitting further comprises a low profile air inlet.

8. A nacelle comprising:
    a drag link fitting mounted to an Inner Fixed Structure (IFS) and adapted to be pivotally attached to an end of a drag link at a drag link coupling portion;
    a vent defining a passageway through the IFS to bring cooling air through the IFS; and,
    an air inlet integrated into the drag link fitting, the air inlet acting to scoop air flow from a bypass air duct and direct it into the vent.

9. The nacelle of claim 8, wherein the drag link fitting further comprises an outer portion and an inner portion, and the outer portion and the inner portion are separately manufactured and are joined to each other prior to the drag link fitting being joined to the IFS.

10. The nacelle of claim 8, wherein the drag link fitting further comprises an outer portion and an inner portion, and the outer portion and the inner portion are separately manufactured and are joined together when they are each joined to the IFS.

11. The nacelle of claim 8 wherein the drag link fitting and the vent are formed as an integral component before they are mounted to the IFS.

* * * * *